United States Patent Office 3,464,808
Patented Sept. 2, 1969

3,464,808
MANUFACTURE OF AMMONIUM POLYPHOSPHATE FROM WET PROCESS PHOSPHORIC ACID
Tommy Carter Kearns, Homewood, Ill., assignor to Swift & Company, Chicago, Ill., a corporation of Illinois
No Drawing. Filed Aug. 18, 1965, Ser. No. 480,788
Int. Cl. C05b 9/00
U.S. Cl. 71—34
7 Claims

ABSTRACT OF THE DISCLOSURE

Phosphoric acid having $P_2O_5$ content of between about 55%–65% is reacted with ammonia under conditions that simultaneously neutralize and molecularly dehydrate the acid whereby at least 20% of the orthophosphate is converted to non-orthophosphate (polyphosphate) and the resulting ammonium polyphosphate possesses self-sequestering properties.

---

This invention relates generally to the production of high grade plant foods having self-sequestering properties. More specifically, this invention relates to a novel process of producing ammonium polyphosphate having the ability, when dissolved in aqueous systems, of solubilizing or sequestering metal ion impurities present in wet process phosphoric acid. The invention also concerns the production of liquid fertilizers which do not form gelatinous precipitates when stored for considerable periods of time.

Wet process phosphoric acid is perhaps the cheapest source of phosphorus utilized in high analysis solid and in liquid plant foods. The wet process method for producing phosphoric acid involves the acidulation of phosphate rock with an inorgnc acid such as sulphuric acid. The phosphate rock is ground and premixed with weak phosphoric acid to form a slurry. The slurry is introduced into a reactor, sulphuric acid is added, the entire system agitated and cooled. The slurry is pumped to filters, where phosphoric acid of 25–33% $P_2O_5$ is separated from the calcium sulphate precipitate which has formed. The calcium sulphate filter cake is washed with dilute phosporic acid which, along with part of the filtrate, is returned to the head of the system for use in pre-slurrying the ground phosphate rock. The calcium sulphate is further washed with fresh water and is disposed of.

Phosphate rock contains various amounts of impurities. The so-called Florida rock contains relatively large amounts of iron, usually as iron oxide or its hydrates, as well as aluminum and other metal salts and oxides. Often the phosphate rock will contain iron in an amount of up to about 3% by weight, as $Fe_2O_3$. Total impurities may comprise 15–25%, by weight, of the rock. When the phosphate rock is digested with sulphuric acid, as discussed above, the iron compounds, as well as the other impurities occur in a finely divided form and, provided the acid is unsaturated with respect to the impurities, go into solution readily. For example, under normal conditions, i.e., about 25–33% $P_2O_5$ concentration, approximately 90–95% of the iron present will go into the phosphoric acid solution.

This phosphoric acid (25–33% $P_2O_5$) is then evaporated and concentrated to approximately 54% $P_2O_5$. During the concentration, many of the impurities in the acid, which are in solution in the lower strength acid, end up in concentrations exceeding saturation in the higher strength acid. These impurities which precipitate out can be eliminated from the phosphoric acid solution by various clarification means. Impurities, primarily iron and aluminum compounds remaining in the phosphoric acid after removal of insoluble solids, present problems when the phosphoric acid is ammoniated in aqueous solution.

In the manufacture of liquid plant food from wet process phosphoric acid, free ammonia is usually added in about 1.5 to 1.8 mole ratio of $NH_3$ to $H_3PO_4$ to produce a substantially neutral solution and to make a liquid plant food base of about 1 to 3, percent N to percent $P_2O_5$ ratio such as 8–24–0. If potash is required, potash salts can also be dissolved in the solution. If more nitrogen is required supplemental nitrogen salts such as aurea ammonium nitrate can be dissolved in the solution.

Impurities such as dissolved iron and aluminum can cause trouble when aqueous soltuions of the mixed, inorgani,c, water-soluble fertilizers prepared by neutralization of the phosphoric acid with water-soluble, alkaline reactants such as ammonia, ammonium hydroxide, potassium hydroxide, etc. along with other ingredients such as nitrates and chlorides, are contemplated. During the neutralization of the acid containing dissolved impurities, the precipitation of sludge-like impurities such as iron and aluminum salts that are insoluble in near neutral solutions is quite pronounced and it is these formed deposits that settle and clog the transfer and distribution equipment.

One solution to the problem is to neutralize wet process phosphoric acid in solution allowing the impurities to precipitate, then filtering or centrifuging out the precipitate to obtain a clear solution. This is quite difficult and expensive because the precipitate is finely divided and gelatinous which makes filtering almost impossible.

It should be noted that purification of neutral solutions from wet process phosphoric acid results in removal of phosphorous such as iron phosphate as well as the removal of other impurities—themselves plant nutrients. These methods are complex and costly and have not been widely accepted in the fertilizer industry. Liquid, soluble ammonium phosphates have the advantage over the solid ammonium phosphate form in ease of application to crop land an are growing in popularity. It is essential that these solutions be substantially free of insoluble solids to permit practical application.

Previous attempts to obtain non-gelatinous aqueous solutions of ammonium phosphate substantially free of insoluble solids have generally been directed to methods using superphosphoric acid. Superphosphoric acid is made by further evaporation of 54% $P_2O_5$ phosphoric acid to about 70% $P_2O_5$. Superphosphoric acid, having a large percentage of its phosphate in the non-ortho form of which a large portion is in the pyro form, can be neutralized with ammonia in aqueous solutions without the metal ion impurities precipitating. However, superphosphoric acid is a premium chemical as large amounts of free and molecularly combined water must be evaporated from regular phosphoric acid. Furthermore, when superphosphoric acid is reacted with ammonia, the reaction is quite exothermic and heat must be subtracted from the system.

Molecular dehydration of wet process phosphoric acid produces superphosphoric acid having a certain amount of the desirable non-ortho phosphate. In making liquid ammonium polyphosphate the reaction between the ammonia and the superphosphoric acid is quite exothermic and, accordingly, this system must be cooled since the high temperature will hydrolize the desirable non-orthophosphate back to ortho phosphate. The reaction is:

$$(NH_4)_2H_2P_2O_7 + H_2O \rightarrow 2NH_4H_2PO_4$$

Further, a low pH (less than 4.0) will also promote the reaction to destroy the non-ortho phosphates so that it is important that both the ammonia and superphosphoric acid be fed to the reaction vessel at a controlled rate.

Accordingly, it is an object of this invention to produce an ammonium polyphosphate which possesses metal ion sequestering ability when dissolved in an aqueous system.

Another object of this invention is the production of ammonium polyphosphate without the formation of appreciable quantities of highly insoluble iron tripolyphosphate and metaphosphate.

A further object of this invention is to provide a method whereby liquid ammonium polyphosphates of analysis higher than 10-34-0, and derived from wet process phosphoric acid, can be obtained.

Still another object of this invention is the elimination of the costly step of making superphosphoric acid in producing a non-precipitating liquid ammonium phosphate fertilizer.

An additional object of the invention is a method of neutralizing wet process phosphoric acid with an alkaline substance without forming a gelatinous substance.

Other objects, if not specifically set forth herein, will be readily apparent to those skilled in the art from a detailed description of the invention which follows.

Broadly, this invention relates to the production of ammonium phosphates and more specifically to a novel process of producing ammonium polyphosphate having at least 20%, by weight, of its phosphate in the non-ortho form. Generally the product will have about 40-80% of its $P_2O_5$ in the non-ortho form. In some cases at least 50% conversion is preferred. The invention also includes the use of this ammonium polyphosphate as a sequestering agent when wet process acid is neutralized with alkaline substances. It has now been discovered that, from a very simple device, wet process phosphoric acid can be reacted with anhydrous fluid ammonia (gaseous or liquid) at amazing production rates to produce an ammonium polyphosphate having at least 20% of its phosphate content in the non-ortho form. The ammonium polyphosphate is in the form of a hot melt immediately upon exiting the reaction system zone and is promptly quenched by one means or another.

In general, the process of this invention comprises reacting anhydrous ammonia and wet process phosphoric acid under pressure in such a manner that the exothermic heat of reaction is used to supply the energy requirements to molecularly dehydrate the orthophosphoric acid, i.e., convert orthophosphates to non-ortho phosphates. To accomplish this, the reaction is carried out in a jet reactor such as that disclosed in U. S. application of T. C. Kearns, S.N. 444,595, the disclosure of which is hereby incorporated by reference. The reaction product, as it emerges from the reactor, comprises a mixture of superheated steam, molten ammonium polyphosphate and, depending upon the mole ratio of ammonia to phosphoric acid, unreacted ammonia. If the mole ratio of ammonia to phosphoric acid is less than 0.8, the ammonia reaction is complete while a mole ratio above 0.8 results in unreacted ammonia exiting along with the product. This unreacted ammonia is not necessarily objectionable since it can be used to further neutralize the ammonium polyphosphate to a ratio of about 1 to 3 of ammonia to $P_2O_5$ in the quenching step. The molten mixture of ammoniated, condensed phosphates is extremely difficult to handle as such when it comes from the reactor and must be processed immediately before it cools into a glassy hygroscopic mass. To accomplish this, the hot-melt is promptly quenched. This quenching step may be carried out in a variety of ways. For example, the trajectory of the melt can be such that the molten stream is impelled through a gaseous medium (usually air) prior to being dissolved in water. Steam and other gases escape during the flight. The melt is then quenched and dissolved in a cooled aqueous solution and is neutralized with additional ammonia.

Another method of quenching the melt is to submerge the end of the jet reactor below the liquid level of the solution tank. In this method, the melt does not fly through space and therefore the gases do not escape. This has the advantage of no fumes to contend with plus the fact that the entire flow of ammonia required for the final ammonium phosphate solution can be added to the jet reactor because any unreacted ammonia lost in the jet is recondensed with the steam in the aqueous solution. The pH of the solution can be controlled by the weight of ammonia fed to the jet thus eliminating the need for two separate ammonia control systems. This method requires more cooling than the first method because the steam recondenses in the cooled solution. The pH of the ammonium polyphosphate can be about 5.0-8.0 and most desirably around pH 6.0-6.5.

It should be noted at this point that the quenching step may be accomplished by means other than aqueous contact of the hot melt. Intimate contact with relatively cool fertilizer solids will quench the hot melt and indeed is a desirable way of cooling when a granulated product is contemplated. By using already formed solid ammonium polyphosphate as a rolling bed of solids, the hot melt is sprayed on the solids using part of the product as recycle. Ammonia lost in the jet reactor is substantially absorbed in the relatively cool rolling bed.

The apparatus used may comprise an elongated reactor pipe having a diameter less than its length and generally uniform in cross section, said reactor having an inlet end and an outlet end. Inlet tubes are provided at the inlet end of the pipe for feeding ammonia and wet process acid into the pipe. These inlet tubes are connected to a source of supply exterior to the pipe. The inlet tubes can be positioned in spaced apart relationship if desired or positioned concentrically, one within the other. Usually, the inlet tube is merely an open end tube but orifices can be provided if desired, to obtain finer dissemination of reactants. Also the inlet tube can be provided with a plurality of spaced openings, i.e., a manifold type.

One embodiment of an apparatus used to carry out the process for production of ammonium polyphosphates comprises a two fluid jet-type reactor set forth in the above-mentioned Kearns application. Specifically, this jet reactor consists in most cases of about 8 feet of ½ inch alloy 316SS pipe for the phosphoric acid. The gaseous ammonia enters the pipe in a ⅛ inch pipe positioned inside the ½ inch pipe. The length of pipe was varied from 2-16 feet but no significant change in product was found.

In carrying out the reaction, gaseous ammonia and phosphoric acid are supplied in a mole ratio of 0.8-1.6. The phosphoric acid has a $P_2O_5$ content of 54-68% preferably 55-65% before reaction. Liquid ammonia may be used in place of gaseous ammonia but if used, the phosphoric acid should contain about 4% less water. The phosphoric acid is normally preheated to a temperature of about 140-180° F.

In order for the ammonium polyphosphate to be self-sequestering, there must be a conversion of at least 20%, by weight, of the ortho form to non-ortho forms. The polyphosphates are more soluble than the ortho phosphate so by increasing conversion above 20%, more stable solution can be produced from the standpoint of salting out at low temperatures. This extra conversion enables more merchant phosphoric acid to be sequestered as shown in Example IV below. At least 40% conversion is demanded by the trade for a 10-34-0 product. By using strong phosphoric acid (62% $P_2O_5$) it is possible to produce higher grades such as 11-37-0 and 12-41-0. Because of additional sequestering requirements a 50% or higher conversion is desirable, however, it is difficult to obtain a conversion of 50% in superphosphoric acid because of the extreme temperature required. At high temperatures and long hold-up time the iron precipitates as iron tripolyphosphate which is extremely insoluble and will remain as a precipitate in the 10-34-0. By using the process of this invention, localized overheating is eliminated. Further, the hold-up time is reduced to less than 1 second. Accordingly, the instant invention provides a means for obtaining high conversion (40–80%) without the formation of insoluble precipitates. It has been found that the amount of conversion is directly related to the temperature of the jet reactor. Temperature of the reacting mass can be measured by inserting a thermometer in the pipeline at the jet reactor.

Since the instant invention uses the exothermic heat of reaction to conduct the molecular dehydration, maximum attainable temperatures were determined versus acid strength. As a specific example, when gaseous ammonia is reacted with wet process acid of 58% $P_2O_5$ temperature of about 505° F. will be produced and this will, in turn, produce a liquid ammonium polyphosphate grade with approximately 39% conversion, i.e., 39% by weight, of the $P_2O_5$ will be non-ortho phosphate. A 60% acid will produce a product having a conversion of approximately 62%. Using a 55% $P_2O_5$ acid, the temperature will be about 450° F. As an upper limit, the temperature produced in the reactor will be approximately 650° F. Accordingly, using a 55%–65% $P_2O_5$ acid and a temperature between 450° F. and 650° F., one can be assured of producing ammonium polyphosphates having a conversion of at least 20%.

The reaction product as it emerges from the pipe consists of molten ammonium polyphosphate suspended in a high velocity stream of super-heated steam. The residence time of the reactants in the reactor is less than one second and the molten product exits from the reactor at a velocity estimated to be in the order of about at least 50 m.p.h. depending on the amount of steam produced. Analysis of the hot melt shows a product containing about 8–9 weight percent nitrogen and about 55–60 weight percent phosphorus calculated as $P_2O_5$. The distribution of condensed phosphate species depends upon the temperature of the jet reactor but corresponds to that found in SPA for a given conversion. The product contains about 20–80% orthophosphate, 20–45% pyrophosphate, and 0–40% other phosphates.

Generally speaking, the reactions taking place in the reactor are as follows:

(1) $H_3PO_4(H_2O) + NH_3 \rightarrow NH_4H_2PO_4 + (H_2O) + Heat$ ($H_2O$) represents free water present in the ortho phosphoric acid.

(2) $2NH_4H_2PO_4 + Heat \rightarrow (NH_4)_2H_2P_2O_7 + H_2O$
(3) $(NH_4)_2H_2P_2O_7 + NH_4H_2PO_4 \rightarrow (NH_4)_3H_2P_3O_{10} + H_2O$
(4) Other more condensed phosphates are formed in the same manner.

The specific examples that follow are for illustrative purposes only an dare not to be construed as imposing limitations on the scope of the invention other than those set forth in the appended claims.

EXAMPLE I

The apparatus employed to carry out this example was a jet reactor consisting of ⅛ inch SS pipe threaded into an 8 foot section of ½ inch SS pipe.

46.5 lbs. of wet process acid, having a $P_2O_5$ content of 58%, by weight, was preheated to 160° F. and fed into the larger pipe at a rate of 3 lb./min. under 40 p.s.i.g. 5.2 lbs. of gaseous ammonia at a rate of 0.32 lb./min. while under 120 p.s.i.g. was simultaneously supplied to the reaction zone via a smaller pipe. The reaction temperature, about 500° F., was measured by installing a dial thermometer in the pipeline of the reactor. The average reaction residence time was less than one second and the reaction product, which consisted of molten ammonium polyphosphates suspended in a stream of super-heated steam analyzed approximately 9.1–57.4–0 which corresponds to approximately a 0.8 mole ratio $NH_3/H_3PO_4$.

The reactor was stationed over a cooled, agitated tank so that the spray from the jet was directed down into the tank. At the start of the run, the tank contained 40 lbs. of water and the jet operated at the above rate for 15 minutes to produce a 9–30–0 product. The agitation tank contained a pH probe, a thermocouple for monitoring temperature and an ammonia sparger for adding additional ammonia. The partially neutralized melt sprayed from the jet flew through the air and hit the water surface. Steam and other gases escape during the flight. The melt had a pH of about 3 and was neutralized to a pH of about 6.1 with 4.5 lbs. of ammonia at .30 lb./min. from the sparger in the final solution tank. The final solution weighing about 90 lbs. contained dissolved ammonium polyphosphates having about 35% non-ortho phosphates and analyzed 8.88–29.95–0 which corresponds to a mole ratio of $NH_3/H_3PO_4$ of about 1.5:1.

EXAMPLE II

The same equipment setup used in Example I was utilized for this example except that the outlet end of the reactor was submerged below the liquid level of the solution tank.

Wet process acid of 61% $P_2O_5$ content was supplied to the reactor for about 18 min. at the rate of 3 lb./min. Gaseous ammonia was simultaneously supplied for about 18 min. at the rate of 0.74 pound per minute under 110 p.s.i.g. The reaction temperature was about 550° F. and the product exiting the tube was quenched and dissolved in the final solution tank containing about 35 lbs. of $H_2O$. In this submerged manner, the melt did not fly through the air and therefore, the gases did not escape. Since unreacted ammonia was recondensed with the steam in the aqueous solution, the pH of the solution was controlled by the rate of ammonia fed to the jet and thus eliminated the need for two separate ammonia control systems. By this method a solution containing 65.8% converted to non-ortho phosphate was produced analyzing 10.77–35.53–0.

EXAMPLE III

In this example, the jet reactor was positioned into a batch granulator and the hot melt sprayed onto a rolling bed of fertilizer solids (solid ammonium polyphosphate).

10 lbs. of wet process acid having 59% $P_2O_5$ content was supplied to the jet at a rate of 3½ lbs./min. and 1½ lbs. of gaseous ammonia was supplied at a rate of 0.5 lb./min. at a 120 p.s.i.g. The reaction temperature was about 550° F. Ammonia lost in the jet reactor was partially absorbed in the relatively cool rolling bed comprising 30 lbs. of solids. The over-all ammonia to phosphoric acid mole ratio was about 1–1 of which .8 to 1 was reacted in the jet and .2 to 1 was reacted in the rolling bed. The final product had an analysis of about 12–56–0 with 39% conversion. Some of the non-ortho phosphate was hydrolyzed in the hot bed by steam trapped in the solids resulting in a lower conversion rate.

EXAMPLE IV

Sequestering ability of ammonium polyphosphate

A 10–34–0 grade with 62% conversion (62% of the $P_2O_5$ is in the non-ortho form) made by the jet process was used to sequester a 6–18–6 liquid grade. Solutions containing 20, 30, 40 and 50% of the $P_2O_5$ from the above 10–34–0 and the remaining $P_2O_5$ from regular 54% wet process phosphoric acid were made using in addition, aqua ammonia and muriate of potash. The formulas were as follows:

| Percent $P_2O_5$ derived from 10–34–0 | 20 | 30 | 40 | 50 |
|---|---|---|---|---|
| Phos acid 54% $P_2O_5$ | 53.3 | 46.7 | 40.0 | 33.3 |
| 10–34–0 | 42.3 | 63.5 | 84.6 | 105.8 |
| Aqua ammonia 24% N | 82.3 | 73.5 | 64.8 | 57.0 |
| Muriate of potash 62% $K_2O$ | 38.7 | 38.7 | 38.7 | 38.7 |
| Water | 183.4 | 177.6 | 171.9 | 165.2 |
| Total | 400.0 | 400.0 | 400.0 | 400.0 |

The above figures represent grams used to make up the batch. After 32 days at 40° F. these four samples were then observed to determine the sequestering ability and results are as follows:

Sample Evaluation
[Percent $P_2O_5$ derived from 10-34-0]

| | |
|---|---|
| 50% | Excellent—completely sequestered. |
| 40% | Do. |
| 30% | Good—less than 1% by volume of easily dispersed solids on the bottom of container. |
| 20% | Poor—unsequestered. 14% by volume of sludge on bottom of container. |

EXAMPLE V

Wet process phosphoric acid having 62% $P_2O_5$ content was supplied at a rate of 3 lb./min. to the reactor at 40 p.s.i.g. and gaseous ammonia was supplied at 0.75 lb./min. at 120 p.s.i.g. The end of the jet reactor was submerged below the level of the final solution tank. The amount of water initially added to the tank in this case was reduced in order to produce a nominal grade somewhat higher than 10-34-0. The pH was continually adjusted to 5.5; by controlling the rate of addition of ammonia to the jet reactor, a jet reactor temperature of 550° F. was obtained. A highly concentrated solution analyzing 11.3-40.72-0 with 66.4% conversion was produced.

EXAMPLE VI

Grade 6-18-6
Size—40,000, 61% $P_2O_5$, 55° F. Jet

| Formula | Lb./ton | Gram/batch | Part/1,000 parts |
|---|---|---|---|
| $H_3PO_4$ | 590 | 11,800 | 295 |
| $NH_3$ | 146 | 2,920 | 73 |
| KCl (62% $K_2O$) | 194 | 3,880 | 97 |
| $H_2O$ | 1,070 | 21,400 | 535 |
| | 2,000 | | |

The muriate of potash and water were added to the batch tank. While the jet was operating it was moved into the solution tank and an incremental amount of acid was passed through the jet amounting to 11,800 grams. The water temperature was 45° F. and after the muriate of potash was added, it dropped to 27° F. After the addition of the melt and the ammonia it rose to 184° F.

Analysis of product:

5.62-17.85-6.00
56.9% conversion.

Complete liquid grades can be made by adding other salts as shown in the above method.

The exact chemical nature of the product exiting the reactor is not known, however, it is known for certain that the product is not simply mono- or diammonium phosphate nor a mixture thereof. The product comprises a substantial amount of condensed phosphates of the formula $H_{n+2}P_nO_{3n+1}$ wherein some of the hydrogen has been substituted with ammonia radicals. Generally $n$ will be an integer from 1 to 5. Generally speaking the product will comprise about 20-80% ortho phosphate, about 20-45% pyrophosphate, and about 1-40% other phosphates. The nitrogen content of this melt is about 8-12 weight percent and the phosphorous expressed as $P_2O_5$, is in the range of 55-60 weight percent. A 10-34-0 product is preferred by dissolving this melt in water and neutralizing the free acid with additional ammonia.

I claim:

1. A process for preparing ammonium polyphosphates having self-sequestering properties comprising: supplying a stream of ammonia to a jet reactor; supplying a stream of phosphoric acid having a $P_2O_5$ content of between about 54% and about 68% to said jet reactor; and contacting said stream of ammonia with said stream of phosphoric acid in said reactor at temperatures of between about 450° F. and about 650° F. for a period of less than one second to form molten droplets of ammonium polyphosphate.

2. The method of claim 1 wherein the droplets of molten ammonium polyphosphate are subsequently quenched.

3. The process of claim 1 wherein the $P_2O_5$ content of the acid is between about 60% and about 62%.

4. The process of claim 1 wherein at least 50% of the orthophosphate in the acid is converted to non-orthophosphate.

5. The process of claim 2 wherein the quenching is accomplished by impelling the reaction product through space and dissolving it in an aqueous system.

6. The process of claim 5, comprising in addition the step of further neutralizing the reaction product to a pH value of between about 5 and 8.

7. The process of claim 2 wherein the quenching is accomplished by contacting the reaction product with relatively cool fertilizer solids.

References Cited

UNITED STATES PATENTS

| | | | |
|---|---|---|---|
| 3,171,733 | 3/1965 | Hignett et al. | 71—48 |
| 3,375,063 | 3/1968 | Bookey et al. | |
| 3,382,059 | 5/1968 | Getsinger | 23—106 X |

S. LEON BASHORE, Primary Examiner

R. D. BAJEFSKY, Assistant Examiner

U.S. Cl. X.R.

23—106; 71—43

PO-1050
(5/69)

UNITED STATES PATENT OFFICE
CERTIFICATE OF CORRECTION

Patent No. 3,464,808          Dated September 2, 1969

Inventor(s) TOMMY CARTER KEARNS

It is certified that error appears in the above-identified patent and that said Letters Patent are hereby corrected as shown below:

Column 1, line 36--after with an, cancel "inorgnc" and substitute therefor --inorganic--;

Column 2, line 14--after mixed, cancel "inorgani,c" and substitute therefor --inorganic--;

Column 5, line 51--after only,, cancel "an dare" and substitute therefor --and are--;

Column 7, line 32--after 40,000, insert therefore --grams--

Column 7, line 32--after $P_2O_5$, cancel "55°F" and substitute therefore --555°F--

SIGNED AND
SEALED
AUG 11 1970

(SEAL)
Attest:

Edward M. Fletcher, Jr.
Attesting Officer

WILLIAM E. SCHUYLER, JR.
Commissioner of Patents